United States Patent [19]
Carter et al.

[11] Patent Number: 5,542,317
[45] Date of Patent: * Aug. 6, 1996

[54] ROTARY INDEX TABLE ASSEMBLY

[75] Inventors: Thomas J. Carter, Shelby Township, Macomb County; Arthur C. Mason; John H. Nolan, both of Harrison Township, Macomb County, all of Mich.

[73] Assignee: Utica Enterprises, Inc., Shelby Township, Mich.

[ * ] Notice: The term of this patent shall not extend beyond the expiration date of Pat. No. 5,450.771.

[21] Appl. No.: 410,929

[22] Filed: Mar. 27, 1995

Related U.S. Application Data

[63] Continuation of Ser. No. 78,544, Jun. 16, 1993.

[51] Int. Cl.⁶ ............................................ B23B 29/24
[52] U.S. Cl. ............................................ 74/813 L
[58] Field of Search ............................................ 74/813 L

[56] References Cited

U.S. PATENT DOCUMENTS

| | | |
|---|---|---|
| 3,507,916 | 4/1970 | Signer . |
| 3,718,055 | 2/1973 | Maier . |
| 3,797,333 | 3/1974 | Maier . |
| 3,824,892 | 7/1974 | Bondie et al. . |
| 3,889,555 | 6/1975 | Frank et al. . |
| 3,941,014 | 3/1976 | Benjamin et al. . |
| 4,159,658 | 7/1979 | Parkinson . |
| 4,353,271 | 10/1982 | Pieczulewski . |
| 4,380,939 | 4/1983 | Gardner . |
| 4,653,739 | 3/1987 | Moore . |

*Primary Examiner*—Charles A. Marmor
*Assistant Examiner*—Mary Ann Battista
*Attorney, Agent, or Firm*—Brooks & Kushman P.C.

[57] ABSTRACT

A rotary index table assembly including an annular positioning mechanism (22) that cooperates with an air bearing (30) to accurately position a rotary index table (14) on a base (12). The annular positioning mechanism (22) includes a base mounted crown gear (24), a table mounted crown gear (26) and a movable crown gear (28) that is moved out of engagement with the base and table mounted crown gears to permit the indexing rotation and that is thereafter moved into engagement with the base and table mounted crown gears to locate the table with respect to the base while the air bearing supports the table on the base to permit the accurate positioning. A rotary drive (18) of the table assembly is preferably constructed to include a double enveloping worm gear set (32) and a polygonal drive coupling (34) that are capable of transmitting relatively large torque to the table while still having a compact construction.

8 Claims, 9 Drawing Sheets

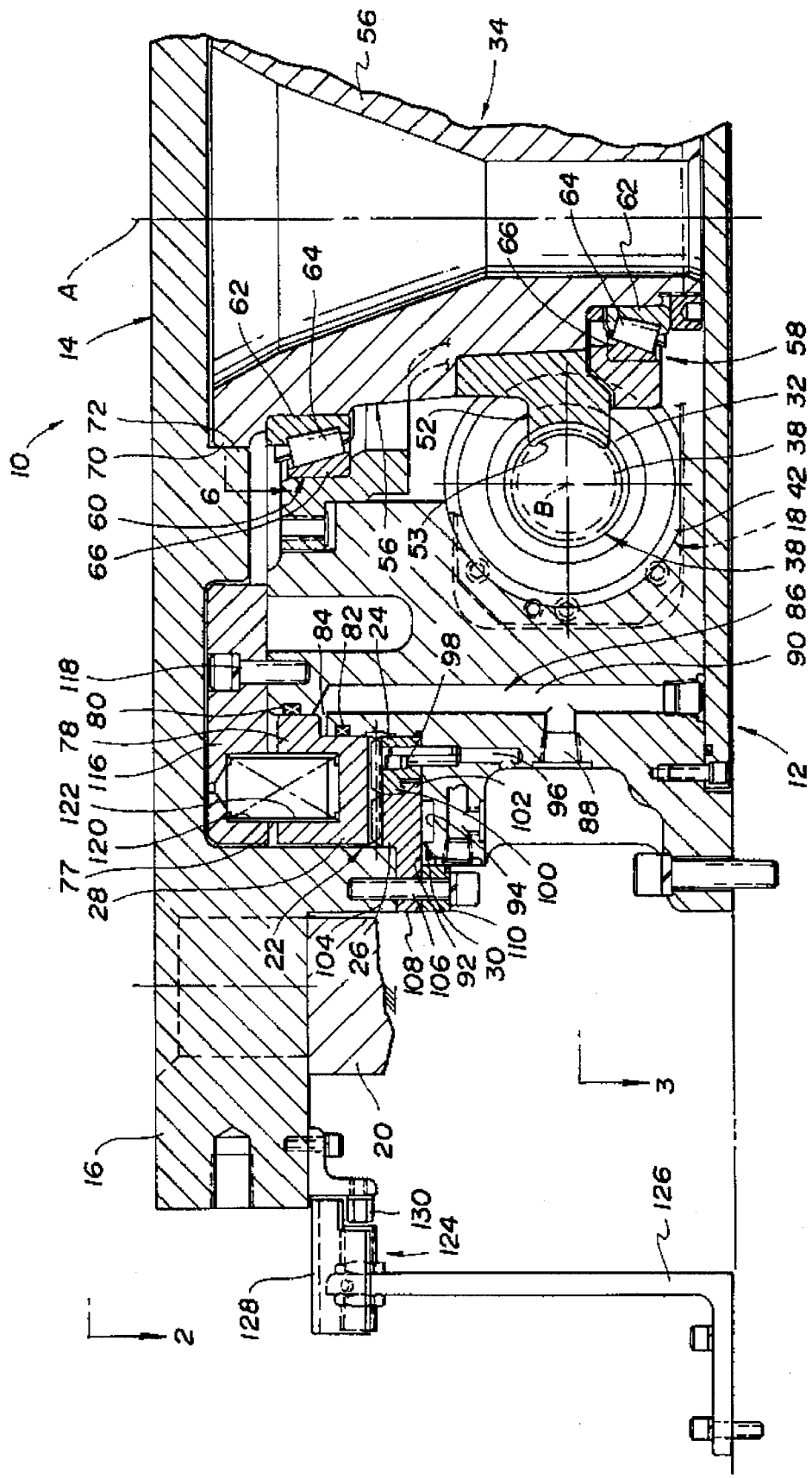

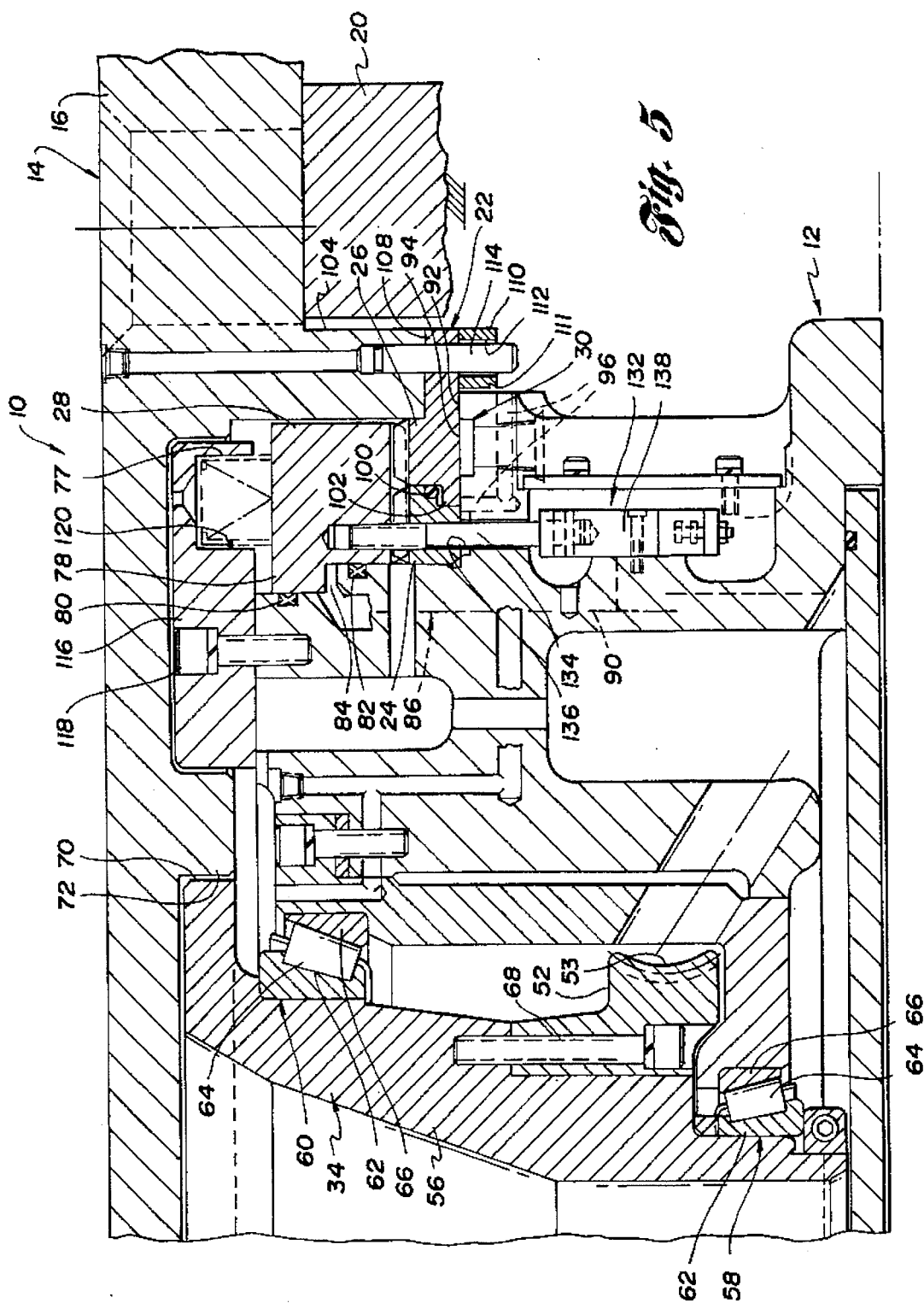

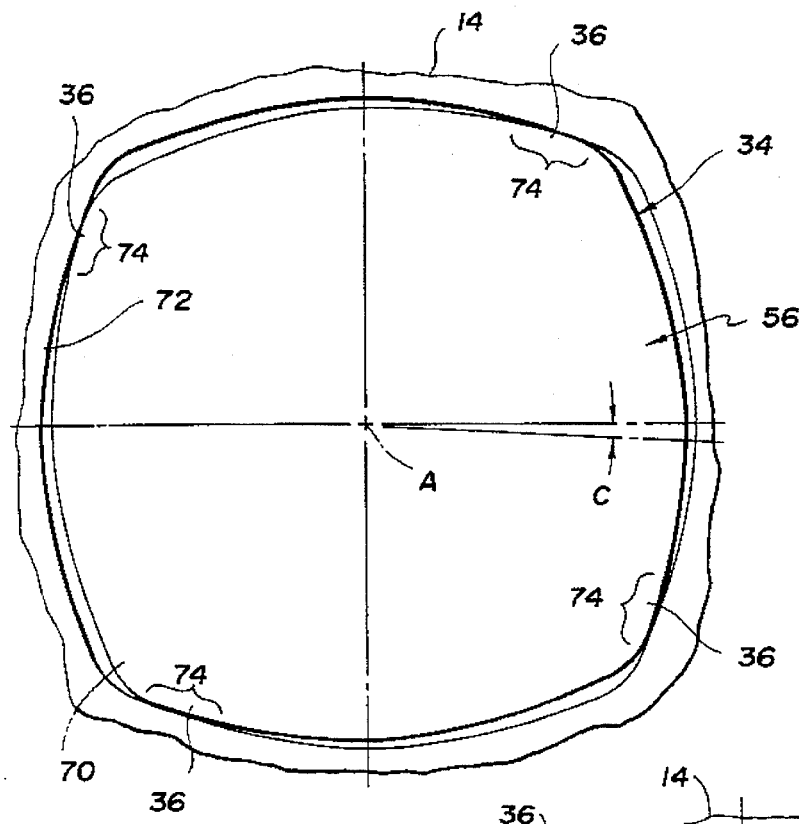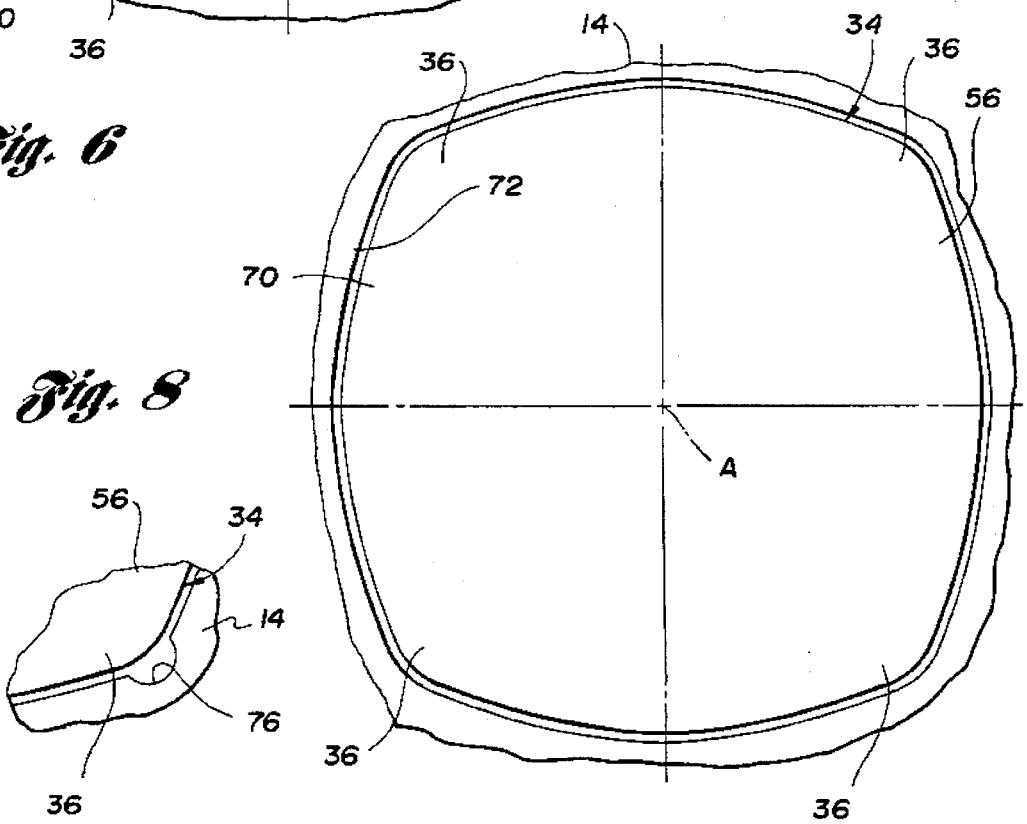

ROTARY INDEX TABLE ASSEMBLY

This is a continuation of copending application Ser. No. 08/078,544 filed on Jun. 16, 1993.

TECHNICAL FIELD

This invention relates to a rotary index table assembly for moving workpieces being processed.

BACKGROUND ART

Rotary index table assemblies for processing workpieces such as disclosed by U.S. Pat. No. 3,718,055 Maier have previously included three annular crown gears, with one annular crown gear mounted on a base of the assembly, with a second annular crown gear mounted on a rotary table of the assembly, and with the third annular crown gear movable into and out of engagement with the base and table mounted crown gears so as to selectively position the rotary table both circumferentially and radially with respect to the rotational axis. This circumferential and radial positioning about the rotational axis results from the fact that the teeth of the crown gears extend radially from the rotational axis and taper inwardly to thereby provide both modes of the positioning. Other rotary index table assemblies which utilize crown gears for positioning are disclosed by U.S. Pat. Nos. 3,889,555 Frank et al and 4,353,271 Pieczulewski.

Driving rotation of rotary index tables has previously been accomplished by the use of worm gear sets. For example, U.S. Pat. Nos. 3,941,014 Benjamin et al and 4,159,658 Parkinson disclose straight worm gear sets that rotatively drive associated rotary tables during index in association with crown gears that provide positioning after the rotation. Furthermore, machine table movement has previously been provided by double enveloping worm gear sets such as disclosed by U.S. Pat. No. 3,824,892 Bondie et al and, as disclosed by U.S. Pat. No. 4,653,739 Moore, has been utilized to provide rotary positioning of a workpiece table. Such double enveloping worm gear sets have surface-to-surface contact as opposed to line contact provided by straight worm gear sets and thus have greater capacity to provide rotational driving of greater loads for the same size unit. Rotational positioning for indexing has also been previously provided by polygonal type drive couplings such as disclosed by U.S. Pat. No. 3,507,169 Signer wherein a rotary drive member having polygon surfaces distributes the driving force.

U.S. Pat. No. 4,380,939 discloses a rotary indexing table which includes wedging rings for providing clamping to prevent table rotation and which is unclamped to allow the indexing rotation. During the rotation, pressurized air is supplied to an annular chamber to lift the table for easier rotation.

DISCLOSURE OF INVENTION

An object of the present invention is to provide an improved rotary index table assembly.

In carrying out the above and other objects of the invention, the rotary index table assembly of the invention includes a base and a rotary index table having a central rotational axis and an outer periphery. A rotary drive of the assembly rotates the index table on the base for indexing rotation about the rotational axis. Stationary supports support the periphery of the table to prevent movement thereof during machining of a workpiece supported by the table. An annular positioning mechanism of the assembly includes a base mounted crown gear, a table mounted crown gear and a movable crown gear that is disengaged from the base mounted crown gear and the table mounted crown gear to permit the indexing rotation of the table and that is thereafter movable into engagement with the base mounted crown gear and the table mounted crown gear to locate the table with respect to the base after each indexing rotation. An air bearing of the assembly supports the table on the base during the indexing rotation and the positioning of the table by the annular positioning mechanism after indexing rotation to provide more accurate table positioning by removing weight of the table from the supports.

In its preferred construction, the rotary index table assembly includes a double enveloping worm gear set that rotates the table. This preferred construction of the rotary drive also includes a polygonal drive coupling having a plurality of polygonal drive lobes that rotate the table. Cooperation between the double enveloping worm gear set of the rotary drive and the polygonal drive coupling driven thereby with the drive lobes that rotate the table provides a relatively compact construction which nevertheless can transmit a relatively large torque due to the manner in which both the double enveloping worm gear set and the drive lobes of the coupling distribute the driving force over surface-to-surface contact.

In its preferred construction, the rotary index table assembly has the annular positioning mechanism provided with a plurality of springs that bias the movable crown gear into engagement with the base mounted crown gear and the table mounted crown gear.

The movable crown gear includes an annular piston portion, and the positioning mechanism also includes a hydraulic circuit that selectively provides pressurized hydraulic fluid to the piston portion of the movable crown gear to thereby provide movement thereof against the bias of the springs out of engagement with the base mounted crown gear and the table mounted crown gear to permit the indexing rotation under the impetus of the rotary drive.

The preferred construction of the rotary index table assembly also includes an annular bearing surface on which the table mounted crown gear is slidably supported. This annular bearing surface has an annular recess to which pressurized air or another suitable gas such as nitrogen is supplied to support the table on the base for the indexing rotation and for the positioning as the movable crown gear is engaged with the base mounted crown gear and the table mounted crown gear. The base mounted crown gear preferably has a stop that limits upward movement of the table mounted crown gear under the impetus of the pressurized air from the air bearing.

In the preferred construction of the rotary index table assembly, the table includes an annular flange on which the table mounted crown gear is secured. The base mounted crown gear is mounted on the base within the confines of the table mounted crown gear. Furthermore, the piston portion of the movable crown gear extends inwardly toward the rotational axis. In addition, the springs that bias the movable crown gear are located outwardly from the piston portion thereof in alignment with both the base mounted crown gear and the table mounted crown gear.

BRIEF DESCRIPTION OF DRAWINGS

FIGS. 1a and 1b are respectively partial left and right elevational views taken in section through a rotary index table assembly constructed in accordance with the present invention and cooperatively when placed in a slightly overlapping relationship illustrate the construction of the table assembly;

FIG. 5 is an enlarged partial view illustrating a portion of the right side of the table assembly shown in FIG. 1b but with the annular positioning mechanism in an engaged condition to provide positioning of the table assembly;

FIG. 6 is a schematic plan view taken along the direction of line 6—6 in FIGS. 1a and 1b and illustrates a polygonal drive coupling upon rotatively driving of the table for indexing;

FIG. 7 is a schematic plan view similar to FIG. 6 but illustrating the coupling after indexing rotation and positioning of the table; and FIG. 8 is a partial view that illustrates a modified construction of the drive coupling.

BEST MODE FOR CARRYING OUT THE INVENTION

Figure 1B:
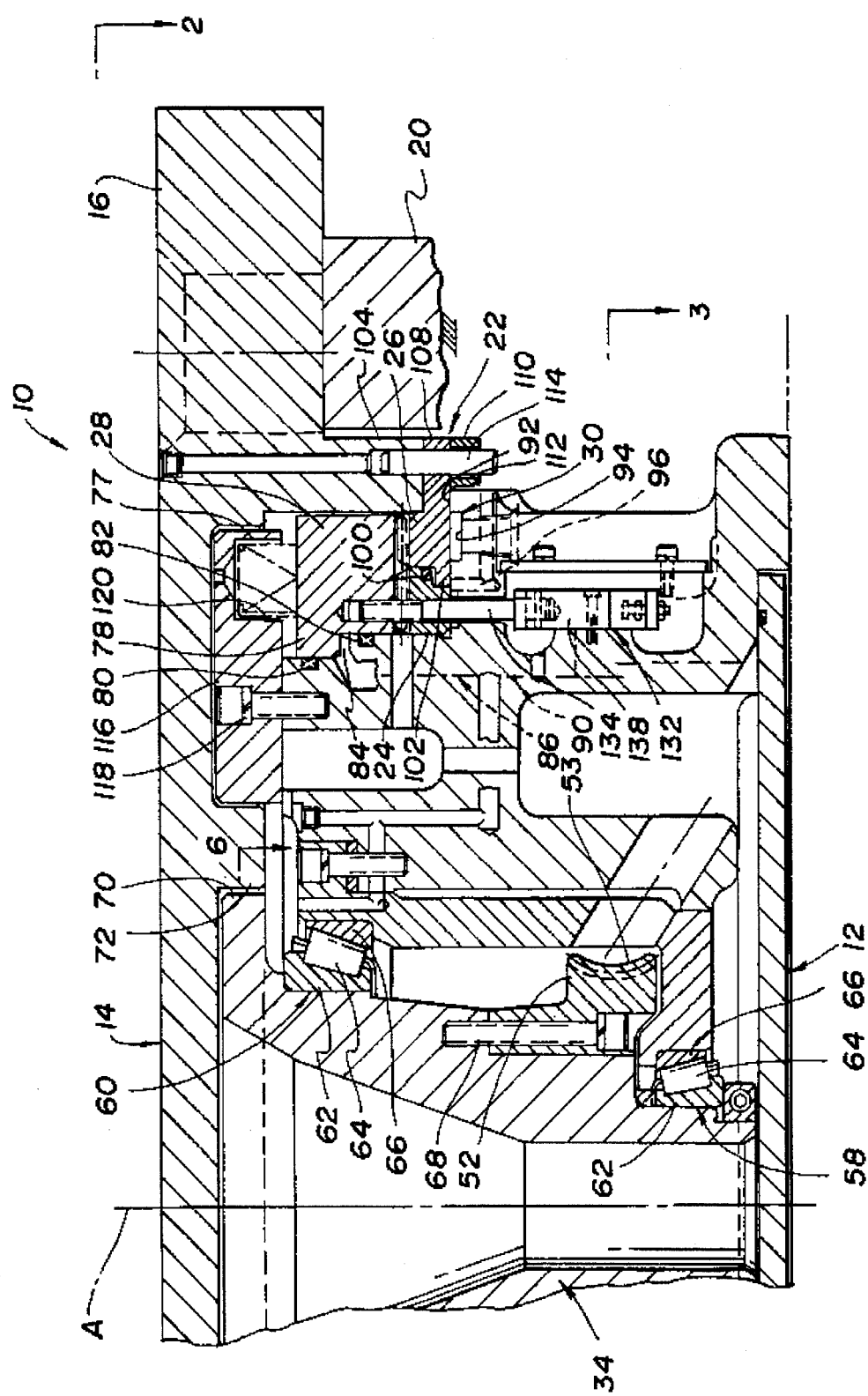
Figure 2A:
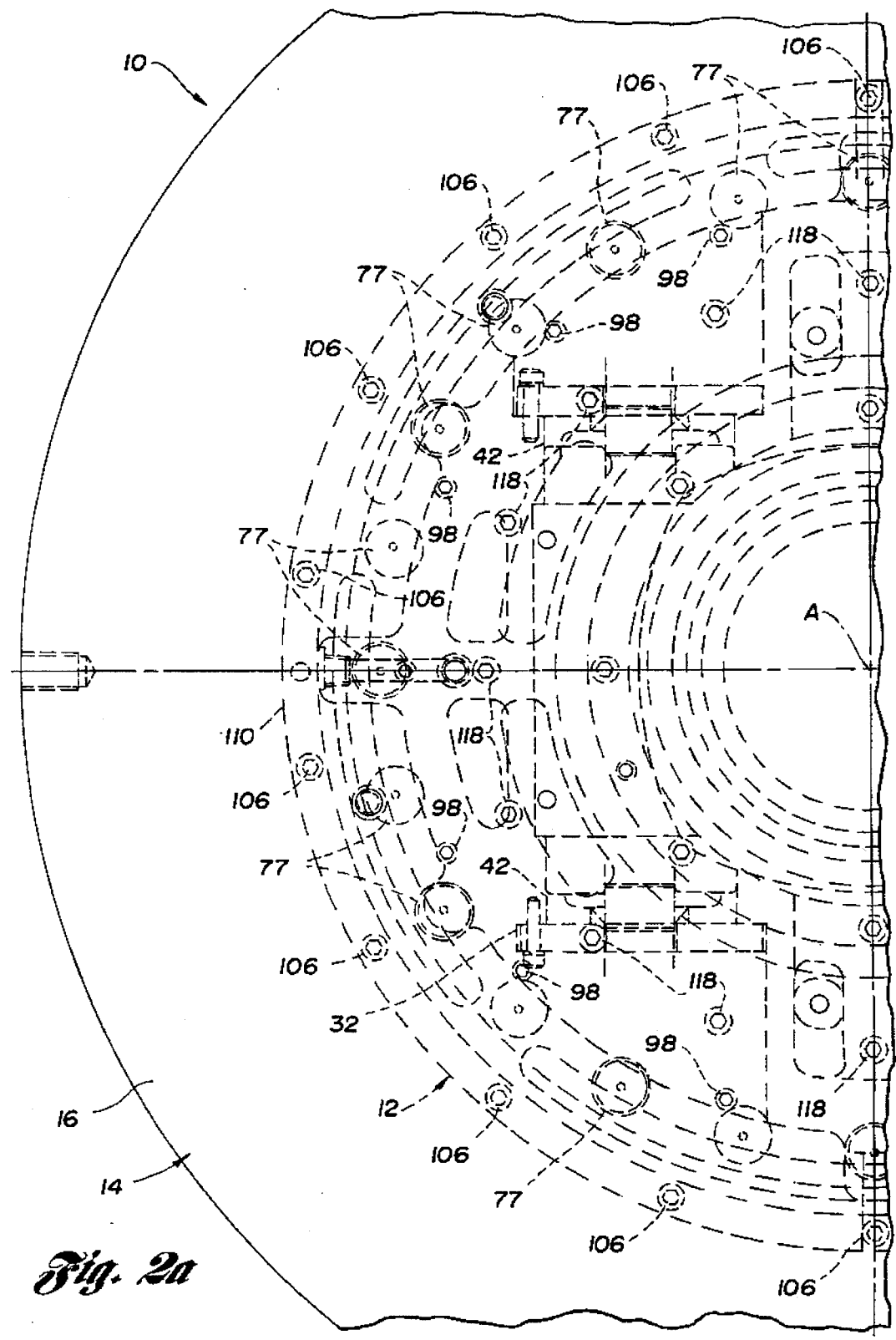
FIGS. 2a and 2b are respectively partial left and right top plan views taken along the direction of line 2—2 in FIGS. 1a and 1b through the table assembly and when placed in a slightly overlapping relationship further illustrate the construction of the table assembly.
Figure 2B:
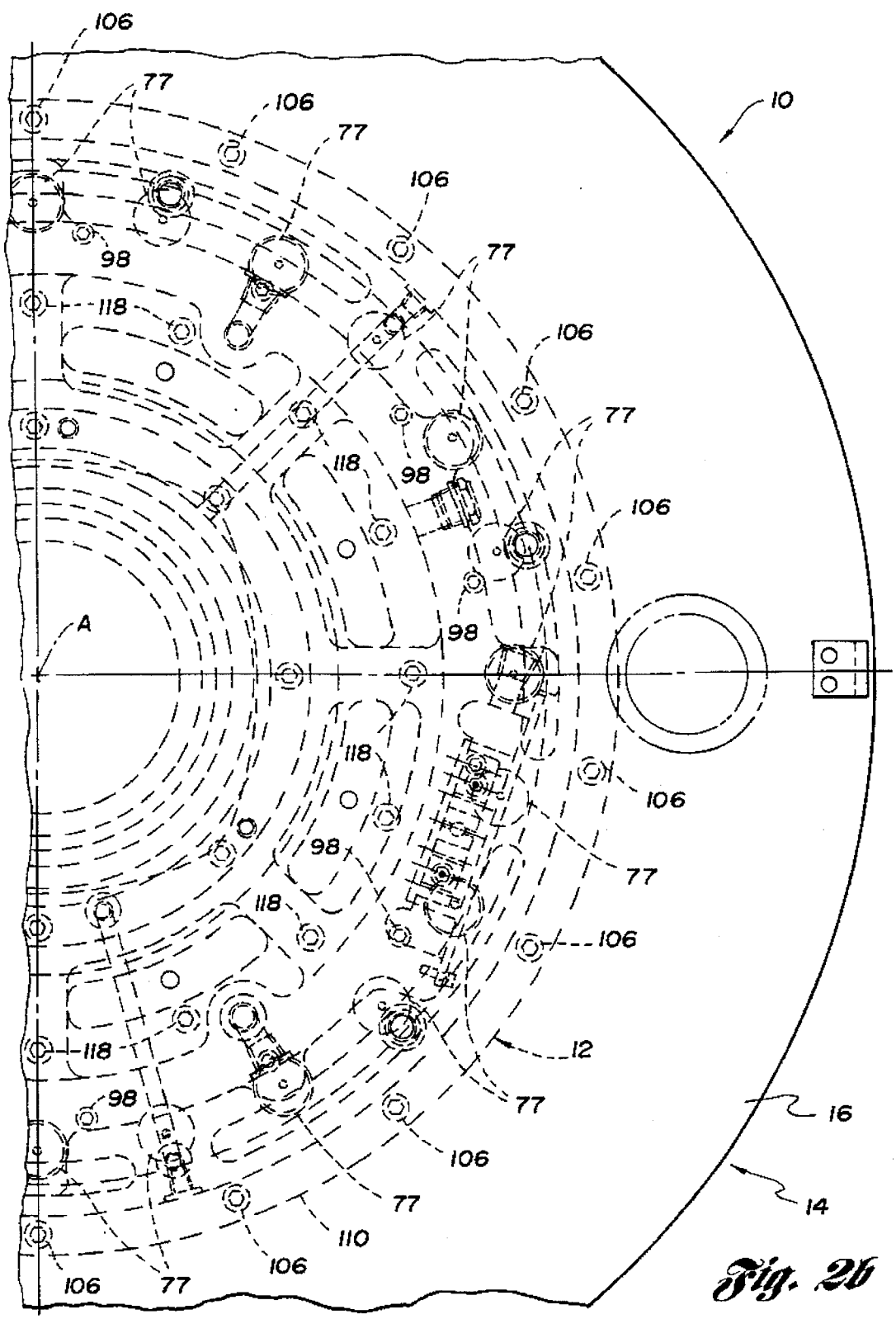
Figure 3A:
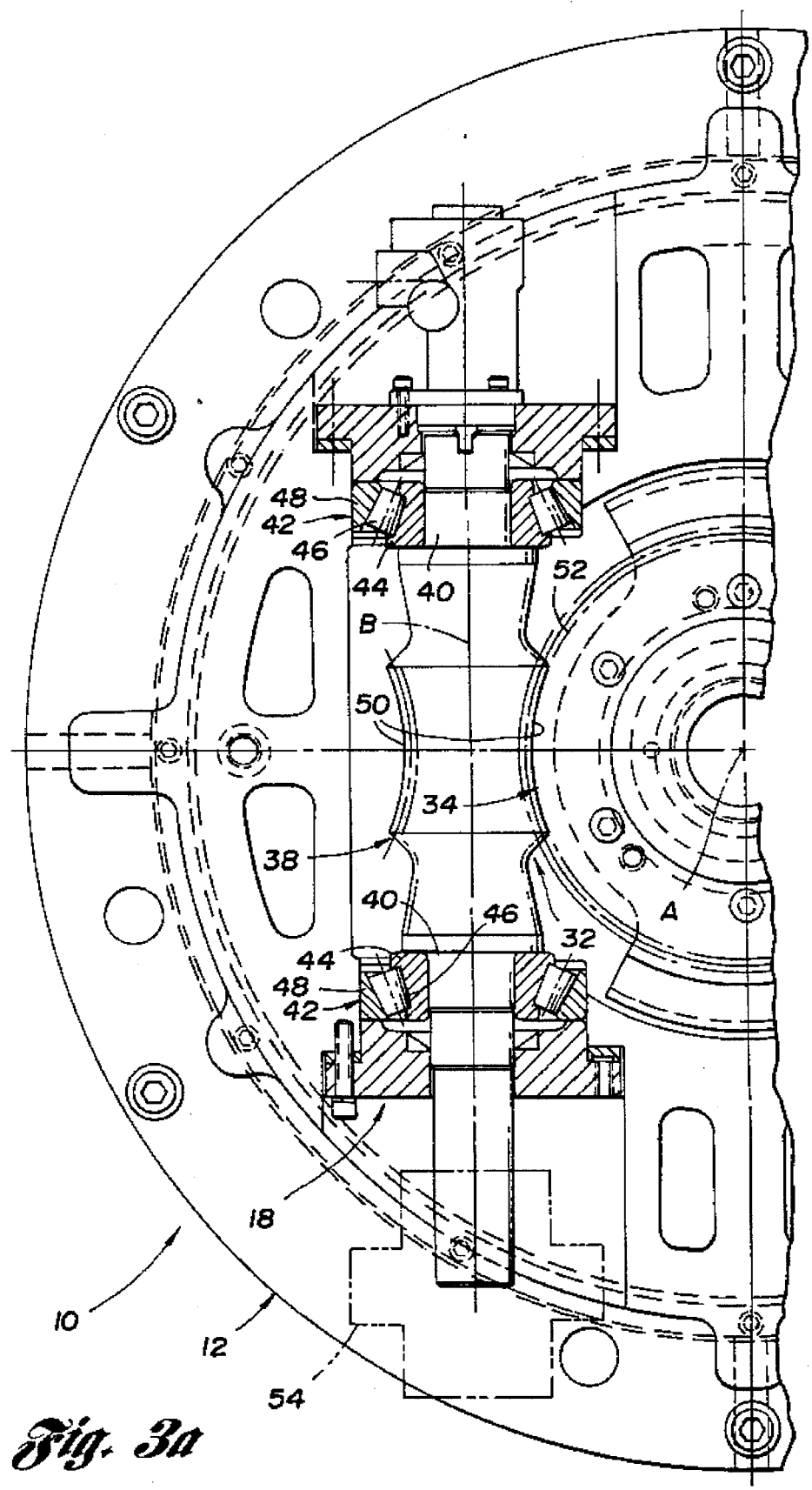
FIGS. 3a and 3b are respectively partial left and right views taken in section through the table assembly along the direction of line 3—3 in FIGS. 1a and 1b and when placed in a slightly overlapping relationship further illustrate the construction of the table assembly.
Figure 3B:
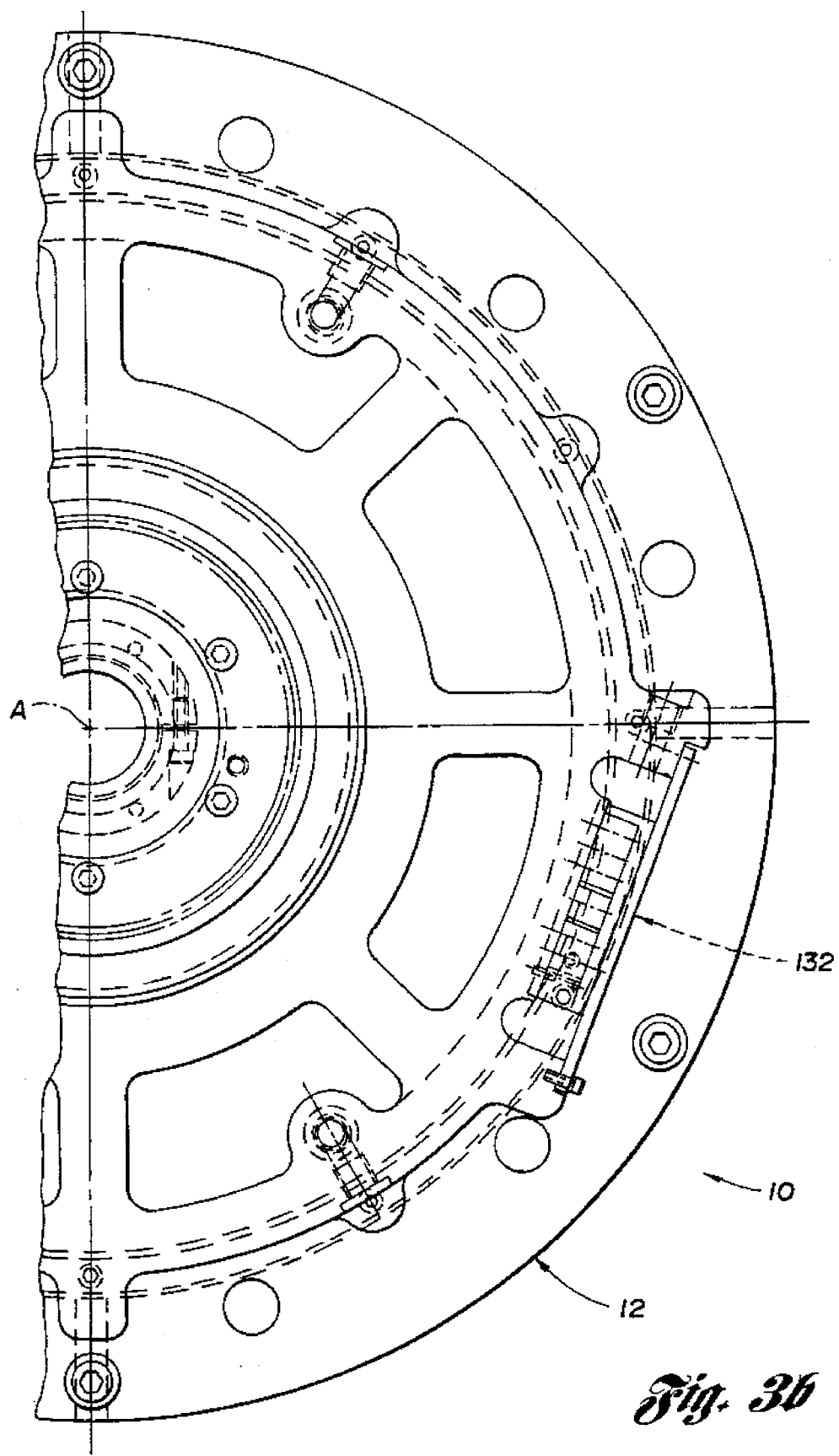

With reference to FIGS. 1a and 1b, a rotary index table assembly constructed in accordance with the present invention is generally indicated by 10 and includes a base 12 and a rotary index table 14 having a central rotational axis A and an outer periphery 16 which has a round shape as best illustrated in FIGS. 2a and 2b. A rotary drive 18 of the table assembly is illustrated in FIGS. 1a and 3a and operates to rotate the index table 14 on the base 12 for indexing rotation about the rotational axis A. Stationary supports 20 are suitably mounted in a fixed relationship to the base 12 and support the periphery 16 of the table to prevent movement thereof during machining of a workpiece supported on the table by an unshown holder.

Figure 4:
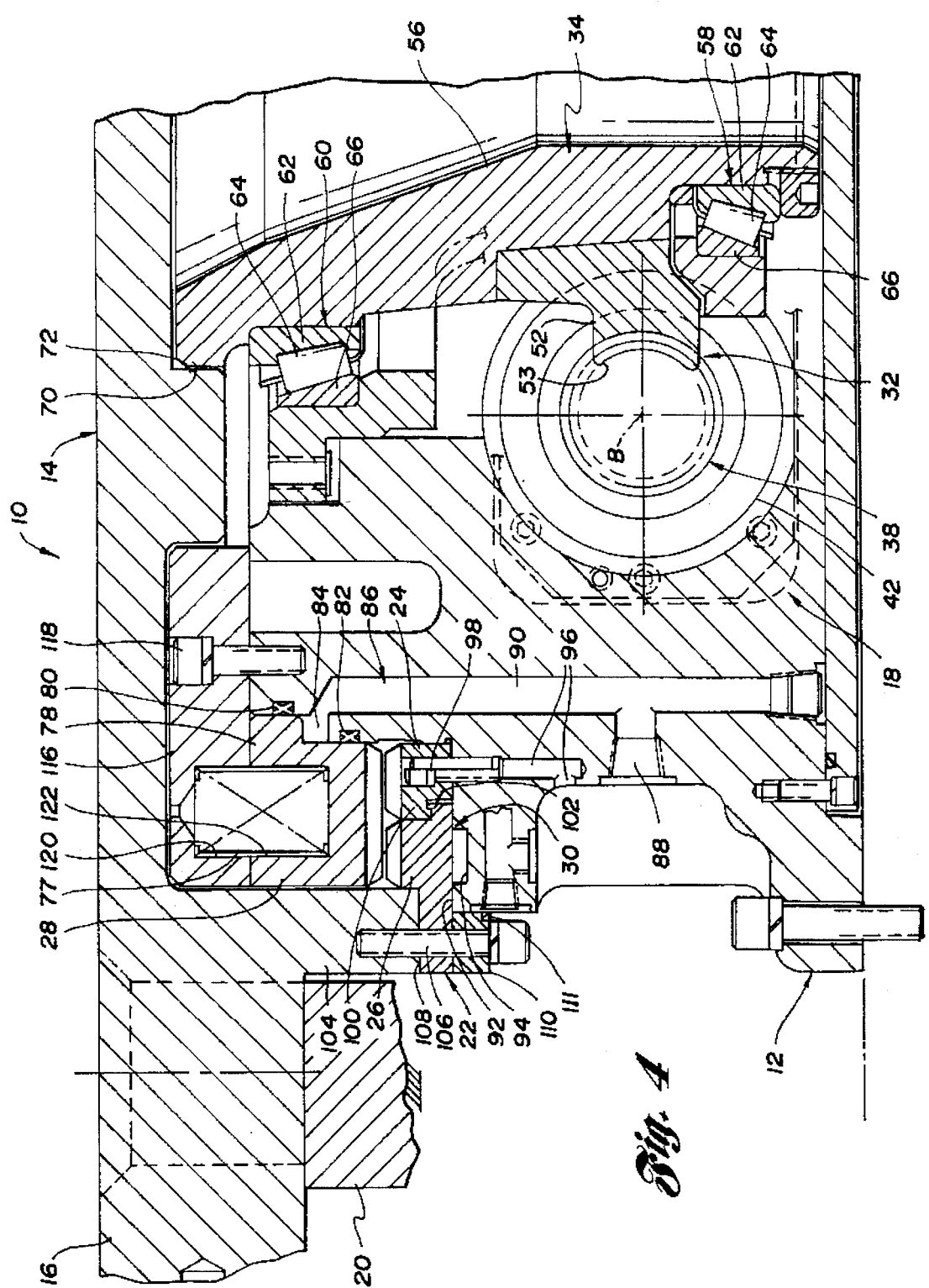
FIG. 4 is an enlarged view of a portion of the left side of the table assembly shown in FIG. 1a and illustrates an annular positioning mechanism in a disengaged condition so as to allow indexing rotation of an index table of the assembly.

As illustrated in FIGS. 1a and 1b as well as in FIGS. 4 and 5, the table assembly 10 includes an annular positioning mechanism 22 including a base mounted crown gear 24, a table mounted crown gear 26, and a movable crown gear 28. Each of these crown gears has an annular shape with vertically projecting teeth. More specifically, the base and table mounted crown gears 24 and 26 have teeth that project upwardly, while the movable crown gear 28 has teeth that project downwardly. During operation of the table assembly as is hereinafter more fully described, the movable crown gear 28 is moved upwardly as shown in FIG. 4 so that it is disengaged from the base mounted crown gear 24 and the table mounted crown gear 26 to permit the indexing rotation of the table 14. After the indexing, the movable crown gear 28 is moved downwardly into engagement with the base mounted crown gear 24 and table mounted crown gear 26 to locate the table with respect to the base. The teeth of the crown gears 24, 26 and 28 extend radially with respect to the rotational axis A and taper inwardly so that the engagement of the movable crown gear 28 with the table mounted crown gear 24 and with the base crown gear 26 provides centering of the table as well as rotational positioning of the table with respect to the rotational axis after each indexing rotation.

As illustrated in FIGS. 1a and 1b as well as in FIGS. 4 and 5, the table assembly 10 also includes an air bearing 30 that supports the table on the base during the indexing rotation and the positioning of the table by the annular positioning mechanism 22. This support of the table by the air bearing 30 provides more accurate table positioning by removing weight of the table from the supports 20 located below the table periphery 16. It should be noted that the enclosed table positioning can be achieved by air pressure that counteracts less than the entire weight of the table, but best results are achieved when the air pressure is sufficiently great to lift the entire weight of the table.

As illustrated by combined reference to FIGS. 1a and 3a, the rotary drive 18 includes a double enveloping worm gear set 32 that rotates the table 14 as is hereinafter more fully described. Rotary drive 18 also includes a polygonal drive coupling 34 which, as shown in FIGS. 6 and 7, has a plurality of drive lobes 36 that rotate the table 14. Provision of both the double enveloping worm gear set 32 and the polygonal drive coupling 34 provides a relatively compact unit that is nevertheless capable of transmitting relatively large torque loads. This results because of the fact that both the double enveloping worm gear set 32 and the polygonal drive coupling 34 have surface-to-surface contact in transmitting the driving force as compared to line contact involved with other types of straight worm gear sets and other rotary couplings.

As illustrated in FIG. 3a, the double enveloping worm gear set 32 includes a worm 38 having opposite ends 40 which are respectively supported by a pair of anti-friction bearing assemblies 42. Each bearing assembly 42 has an inner race 44 that supports the associated worm end 40, tapered bearing elements 46 that roll around the inner race 44, and an outer race 48 that is supported on the base with the tapered bearing elements rollingly supported thereby so as to thus support the worm for rotation about an associated axis B. Between its ends 40, the worm 38 has an inwardly curved shape 50 that extends about the rotational axis A to provide the one enveloping function of the worm gear set. In addition, the worm gear set includes a worm gear 52 that is rotatably supported about the rotational axis A as is hereinafter more fully described to provide rotational driving of the table 14. This worm gear 52 as shown in FIGS. 1a and 4 has a curved shape 53 about the worm axis B so as to provide the other enveloping function of the worm gear set. A suitable schematically illustrated connection 54 shown in FIG. 3a provides rotational driving of the worm 38 by an unshown electric motor or other rotary prime mover such that the worm rotates the worm gear 52 to rotate the table during the indexing cycle as is hereinafter more fully described.

As best illustrated by combined reference to FIGS. 1a and 1b, the polygonal drive coupling 34 includes a coupling member 56 which is rotatively supported on the base 12 by lower and upper antifriction bearing assemblies 58 and 60, respectively. Each of these bearing assemblies includes an associated inner race 62 that is mounted by an associated bearing seat of the coupling member 56, tapered bearing elements 64 that roll about the inner race 62 around rotational axis A, and an outer race 66 that is mounted by the base 12 such that the coupling member is thus rotatably supported about rotational axis A. Worm gear 52 is secured to the coupling member 56 by a plurality of circumferentially spaced bolts 68, only one of which is illustrated in FIG. 1b. This securement is located adjacent the lower antifriction bearing assembly 58 in a spaced relationship from the upper antifriction bearing assembly 60. Above the upper antifriction bearing assembly 60, the coupling member 56 includes a drive portion 70 that is located within a downwardly extending driven portion 72 of the table 14. As illustrated in FIGS. 6 and 7, the drive portion 70 of the coupling member 56 includes the drive lobes 36 of the drive coupling and, as shown, there are four such drive lobes. The driven portion 72 of the table has a slightly larger size than the coupling member drive portion 70 as best shown in FIG. 7 so as to thus allow both radial and circumferential positioning of the table by the positioning member as was previously described and as will hereinafter be more fully described. Rotational driving of the coupling member 56 by the rotary drive previously described rotates the driving portion 70 a small angle C before there is any engagement of the drive lobes 36 with the driven portion 72. This free movement results from the fact that, as mentioned above, the driving portion 70 has a smaller size than the table driven portion 72. After such free movement, the drive lobes 36 of the driving portion 70 engage the table driven portion 72 with surface-to-surface contact as shown at areas 74 that are spaced at 90° intervals from each other about the rotational axis A. This distribution of the driving force allows a relatively large torque to be transmitted by a relatively compact coupling construction.

Cooperation of the double enveloping worm gear set 32 and the drive coupling 34 with the polygonal drive lobes 36 thus provides a relatively compact rotary drive that is nevertheless capable of transmitting relatively large torques during the table indexing while still permitting the table positioning in association with the positioning mechanism 22 and air bearing 30 previously described.

As illustrated in FIG. 8, it should be noted that the driven portion 72 with the lobe construction shown can be manufactured more easily when provided with reliefs 76 adjacent the lobes 36.

With combined reference to FIGS. 1a, 1b, 2a, 2b, 4 and 5, the annular positioning mechanism 22 that positions the table 14 in association with the air bearing 30 includes a plurality of springs 77 that are spaced circumferentially around the rotational axis A and bias the movable crown gear 28 into engagement with the base mounted crown gear 24 and the table mounted crown gear 26. As best illustrated in FIGS. 4 and 5, the movable crown gear 28 includes an annular piston portion 78 that is slidably engaged in a sealed relationship with an upper annular seal 80 on the base 12. A lower annular seal 82 is slidably engaged in a sealed relationship with the movable crown gear 28 at a location below the piston portion 78 to thus cooperate with the upper seal in providing an annular piston chamber 84. A hydraulic circuit 86 having an inlet 88 shown in FIGS. 1a and 4 and having a passage 90 that feeds the pressurized hydraulic fluid to the annular piston chamber 84 thereby moves the movable crown gear 28 against the bias of the springs 77. This movement of the movable crown gear 28 provides disengagement thereof with the base mounted crown gear 24 and the table mounted crown gear 26 to permit the indexing rotation of the table 14 under the impetus of the rotary drive previously described.

As best illustrated in FIG. 4, the air bearing 30 includes an annular bearing surface 92 which is part of the base 12 and faces upwardly. The table mounted crown gear 26 is slidably supported by the annular bearing surface 92 which has an annular recess 94 to which pressurized air is supplied to support the table on the base for the indexing rotation and for positioning as the movable crown gear 28 is engaged with the base mounted crown gear 24 and the table mounted crown gear 26. The pressurized air flows both outwardly and inwardly along bearing surface 92 as a film for supporting the table. The air is easily exhausted to the environment at the outer side of bearing surface 92 and is exhausted at the inner side of the bearing surface through passages 96 in the base 12 to the environment. Good results are achieved when the air film that flows over bearing surface 92 is about 3 to 5 thousandths of an inch thick and thus supports the entire weight of the table.

After the indexing and positioning, it is also desirable for the air bearing 30 to continue to supply pressurized air but at a lower level so that there is continual air flow that prevents dust, machining coolant and any other foreign matter from entering the table assembly at the bearing surface 92. The lower pressure air flow that continues between the indexing cycles also provides a continual cleaning action of the bearing surface 92. Satisfactory results have been achieved with the higher pressure air being supplied at approximately fifty pounds per square inch, of pressure and with the lower pressurized air being supplied at a pressure of approximately five pounds per square inch, the magnitudes of which can be varied to account for the table weight and other characteristics of the particular table. It should also be appreciated that while it is most preferable to utilize atmospheric air, it is also possible for the air bearing to use another gas such as, for example, nitrogen.

As best illustrated in FIG. 4, the base mounted crown gear 24 is secured to the base 12 by a plurality of circumferentially spaced bolts 98, only one of which is shown. This base mounted crown gear 24 also has a stop 100 that limits upward movement of the table mounted crown gear 26 under the impetus of the pressurized air from the air bearing to about twenty thousandths of an inch. More specifically, the stop 100 has an annular shape that projects radially above an annular stop 102 on the table mounted crown gear 26. Table 14 includes an annular flange 104 that projects downwardly and has the crown gear 26 mounted thereon and secured by a plurality of circumferentially spaced bolts 106, only one of which is shown. More specifically, the table mounted crown gear has a flange 108 that projects radially outward with the bolts 106 extending upwardly through associated holes in this flange for securement to the downwardly projecting table flange 104. Bolts 106 also extend through and mount an oil drip member 110 of an annular shape. This oil drip member 110 as shown in FIGS. 4 and 5 has an annular notch 111 that prevents machining coolant from wicking upwardly toward the outer extremity of the bearing surface 92. As illustrated in FIG. 1b, drip member 110 also has circumferentially spaced vertical holes 112, only one shown, receiving downwardly projecting guide pins 114 that extend downwardly from the table flange 104 through associated holes in the flange 108 of the table mounted crown gear 26 to thereby facilitate the assembly.

With reference to FIGS. 1a and 1b, the table 14 as described above includes the annular flange 104 on which the table mounted crown gear 26 is secured, and the base mounted crown gear 24 is mounted on the base 12 within the confines of the table mounted crown gear. Furthermore, the piston portion 78 of the movable crown gear 28 extends inwardly toward the rotational axis and is located inwardly from the base mounted crown gear 24. Furthermore, the springs 77 that bias the movable crown gear 28 are located outwardly from the piston portion 78 thereof in alignment with both the base mounted crown gear 24 and the table mounted crown gear 26. More specifically, the base 12 has an annular ring 116 that is secured by bolts 118 to the rest of the base and projects radially outward from the rotational axis A above the movable crown gear 28. Springs 77 are of the helical type and have upper ends received within downwardly opening holes 120 spaced circumferentially about the base ring 116. Lower ends of the springs 77 are received within upwardly opening holes 122 spaced circumferentially about the movable crown gear 28 to thus provide the downward bias of the movable crown gear into engagement with the base and table mounted crown gears 24 and 26.

As illustrated in FIG. 1a, the table assembly 10 also includes a sensor assembly 124 for detecting when the table 14 has rotated to each indexed position. More specifically, this sensor assembly 124 includes a stationary support member 126 mounted adjacent the table base 12 in a fixed position and having an upper end on which a sensor 128 such as a proximity sensor is mounted. The periphery 16 of the table 14 has sensor members 130 respectively positioned circumferentially thereabout at each rotational position to which the table 14 is to be indexed. Thus, positioning of the table 14 by the rotary drive previously described at each index position is sensed by the sensor assembly 124 to verify that the table assembly is ready for the next cycle of workpiece processing to commence.

As illustrated in FIG. 5, the table assembly 10 also includes a sensor assembly 132 for detecting whether the positioning mechanism 22 is in the crown gear engaged condition or disengaged condition. More specifically, this sensor assembly 132 includes a sensor member 134 that has an upper end secured to the movable crown gear 28 and that extends downwardly through a hole 136 in the base mounted crown gear 24 to a sensor 138 mounted on the base 12. Upward and downward movement of the sensor member 134 along with the movable crown gear 28 is thus sensed by the sensor 138.

While the best mode for carrying out the invention has been described in detail, those familiar with the art to which this invention relates will recognize various alternative designs and embodiments for practicing the invention as defined by the following claims.

What is claimed is:

1. A rotary index table assembly comprising: a base; a rotary index table having a central rotational axis and an outer periphery; a rotary drive including a double enveloping worm gear set; a polygonal drive coupling driven by the double enveloping worm gear set and having a plurality of drive lobes that rotate the index table on the base for indexing rotation about the rotational axis; stationary supports that support the periphery of the table to prevent movement thereof during machining of a workpiece supported by the table; an annular positioning mechanism including a base mounted crown gear, a table mounted crown gear and a movable crown gear that is disengaged from the base mounted crown gear and the table mounted crown gear to permit the indexing rotation of the table and that is thereafter movable into engagement with the base mounted crown gear and the table mounted crown gear to locate the table with respect to the base after each indexing rotation; and an air bearing that supports the table on the base during the indexing rotation and the positioning of the table by the annular positioning mechanism after indexing rotation to provide more accurate table positioning by removing weight of the table from the supports.

2. A rotary index table assembly as in claim 1 wherein the annular positioning mechanism includes a plurality of springs that bias the movable crown gear into engagement with the base mounted crown gear and with the table mounted crown gear, the movable crown gear including an annular piston portion, and a hydraulic circuit that selectively provides pressurized hydraulic fluid to the piston portion of the movable crown gear to thereby provide movement thereof against the bias of the springs out of engagement with the base mounted crown gear and the table mounted crown gear to permit the indexing rotation under the impetus of the rotary drive.

3. A rotary index table assembly as in claim 2 wherein the air bearing includes an annular bearing surface on which the table mounted crown gear is slidably supported, and the annular bearing surface having an annular recess to which pressurized air is supplied to support the table on the base for the indexing rotation and for the positioning as the movable crown gear is engaged with the base mounted crown gear and the table mounted crown gear.

4. A rotary index table assembly as in claim 3 wherein the base mounted crown gear has a stop that limits upward movement of the table mounted crown gear under the impetus of the pressurized air from the air bearing.

5. A rotary index table assembly as in claim 4 wherein the table includes an annular flange on which the table mounted crown gear is secured, and the base mounted crown gear being mounted on the base within the confines of the table mounted crown gear.

6. A rotary index table assembly as in claim 5 wherein the piston portion of the movable crown gear extends inwardly toward the rotational axis.

7. A rotary index table assembly as in claim 6 wherein the piston portion of the movable crown gear is located inwardly from the base mounted crown gear, and the springs that bias the movable crown gear being located outwardly from the piston portion thereof in alignment with both the base mounted crown gear and the table mounted crown gear.

8. A rotary index table assembly comprising: a base; a rotary index table having a central rotational axis and an outer periphery; a rotary drive having a double enveloping worm gear set; the rotary drive also including a polygonal drive coupling having a drive portion that is rotatively supported by the base projecting upwardly below the table and rotatively driven by the double enveloping worm gear set; the drive portion having a plurality of a drive lobes; the drive coupling also including a driven portion that projects downwrdly from the table to receive the upwardly projecting drive portion; the driven portion having a slightly larger size than the drive portion so as to permit some free movement therebetween after which the drive lobes of the drive portion engage the driven portion with surface-to-surface contact to rotate the index table on the base for indexing rotation about the rotational axis; stationary supports that support the periphery of the table to prevent movement thereof during machining of a workpiece supported by the table; an annular positioning mechanism including a base mounted crown gear, a table mounted crown gear and a movable crown gear that is disengaged from the base mounted crown gear and the table mounted crown gear to permit the indexing rotation of the table and that is thereafter movable into engagement with the base mounted crown gear and the table mounted crown gear to locate the table with respect to the base after each indexing rotation; and an air bearing including an annular bearing surface to which pressurized air is supplied to support the table on the base during the indexing rotation and during the positioning of the table by the annular positioning mechanism after the indexing rotation as permitted by the free movement of the drive coupling so as to provide more accurate table positioning by removing weight of the table from the supports.

\* \* \* \* \*

UNITED STATES PATENT AND TRADEMARK OFFICE
CERTIFICATE OF CORRECTION

PATENT NO. : 5,542,317
DATED : August 6, 1996
INVENTOR(S) : Thomas J. Carter, et al.

It is certified that error appears in the above-identified patent and that said Letters Patent is hereby corrected as shown below:

Title page, item [56],

Under References Cited U.S. Patent Documents, change "3,507,916" to --3,507,169--.

Column 8, line 43 (Preliminary Amendment dated March 27, 1995 page 3), after "of" delete --a--.

Signed and Sealed this

Eighth Day of April, 1997

*Attest:*

BRUCE LEHMAN

*Attesting Officer*  Commissioner of Patents and Trademarks